A. F. SULZER.
STENCIL SHEET AND PROCESS FOR MAKING IT.
APPLICATION FILED APR. 5, 1916.
1,375,866.
Patented Apr. 26, 1921.
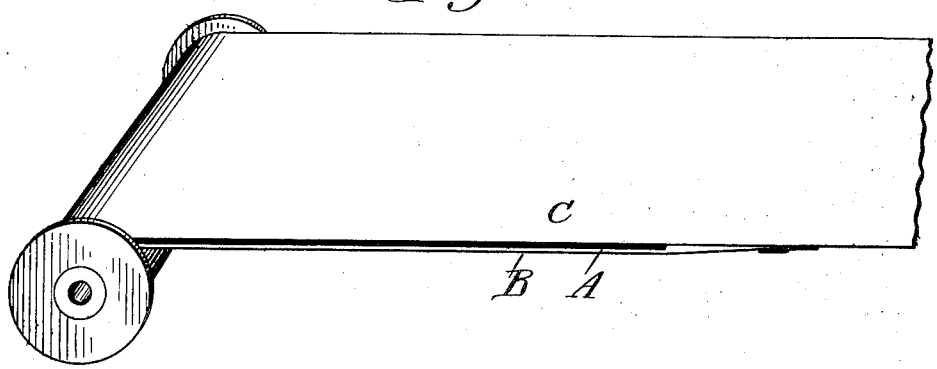

UNITED STATES PATENT OFFICE.

ALBERT F. SULZER, OF ROCHESTER, NEW YORK, ASSIGNOR TO EASTMAN KODAK COMPANY, OF ROCHESTER, NEW YORK, A CORPORATION OF NEW YORK.

STENCIL-SHEET AND PROCESS FOR MAKING IT.

1,375,866.   Specification of Letters Patent.   Patented Apr. 26, 1921.

Application filed April 5, 1916. Serial No. 89,226.

*To all whom it may concern:*

Be it known that I, ALBERT F. SULZER, of Rochester, in the county of Monroe and State of New York, have invented certain new and useful Improvements in Improved Stencil-Sheets and Processes for Making Them; and I do hereby declare the following to be a full, clear, and exact description of the same, reference being had to the accompanying drawings, forming a part of this specification, and to the reference-numerals marked thereon.

My present invention relates to sheet stencils and it has for its object to provide as an article of manufacture a new stencil sheet adapted for use in various arts, especially the photographic art, having a surface provided with a coating which prevents the passage of actinic light rays, such as an opaque coat, but which is capable of being easily removed by a stylus, said sheet also possessing the further characteristic of being non-absorbent or moisture proof. My invention further comprehends a process of making such stencil sheet. To these and other ends, the invention consists in certain improvements and combinations of parts all as will be hereinafter more fully described, the novel features being pointed out in the claims at the end of the specification.

In the drawings:

Figure 1 is a plan view showing a portion of a stencil sheet made in accordance with my present invention;

Fig. 2 is a cross section thereof taken on the line $2^x$—$2^x$ of Fig. 1, and

Fig. 3 is a perspective view showing a roll or cartridge of photographic film illustrating one of the uses of a sheet of stencil embodying the invention.

Similar reference characters throughout the several views indicate the same parts.

Stencil sheets embodying my invention may be used for a variety of purposes where it is desired to produce negatives intended to be used for passing, or projecting light rays therethrough for photographic purposes such as photographic printing, or as transparencies to be used with stereopticons. The principal use to which I have applied my present invention is to employ it in conjunction with spools or cartridges of photographic film adapted for use in cameras as a backing or covering for photographic film, or the transparent support for the photographically sensitized surface, which will protect the latter against actinic light rays, and when the stencil surface has been disrupted by means of a stylus to permit the light rays to affect the sensitized surface along the lines, or in the areas, produced by the use of the stylus. The roll of film or cartridge, shown in Fig. 3 is used for light printing designations upon film in a camera or holder, being so adapted, by the interposition of a stencil sheet A between the photographic film B and the backing sheet C on which it is mounted. The cameras or holders in which this film is used have an opening in rear of the path traversed by the film whereby the oprator may write any inscription or characters desired upon the backing, or covering C, a pointed stylus or pencil being used, which will displace the stencil surface and permit light rays to pass therethrough and cause an inscription to be reproduced by the action of the light on the sensitized surface in exact accordance with the markings applied directly to the backing paper C.

There are many factors to be considered in producing a satisfactory stencil sheet, and because of the fact that the stencil sheet is wound in contact with the photographic film it must not contain substances which will have a tendency to adhere or transfer to the surface of such film, or which will affect or desensitize the photographic emulsion, and further as the film cartridges, after exposure, are often placed as a whole, in a developing solution, *i. e.* in presence with the wrappings, as is the case in what is known as "tank development", hence the stencil sheet must be rendered non-absorbent or waterproof, in order to prevent it when wet, from adhering to the photographic film.

In providing a stencil sheet intended to accomplish the desired results as above stated, I provide a stencil coating on one surface of the web or paper which is opaque, or of such a character as to prevent the passage of actinic light rays and is also capable of easy removal under pressure applied by a stylus, and on the other surface of the paper or web, I provide a waterproof coating. These two coatings are applied in the order stated.

The stencil sheet web is preferably composed of translucent tissue paper 1, which is preferably engine sized, and on one of its surfaces is provided the stencil coating 2 possessing the qualities of being opaque or impervious to the transmission of actinic light rays, and also capable of being easily and, practically, completely removable under pressure applied thereto by the stylus. This coating is formed of a composition of waxy material and a pigment such as lamp black, and to this mixture is added a quantity of mineral oil or other non-drying oil and a dye, preferably of a blue or black color, for coloring the wax and oil which forms the menstruum, such ingredients being triturated and blended in a heated grinding mill to produce a homogeneous mixture which when applied to the surface of the paper is capable of being almost completely removed, when the coating is acted upon by a stylus, without injury to the paper itself.

Subsequent to the application of the stencil coating I apply to the other surface of the paper or web, a waterproofing coating 3, formed by a transparent wax, preferably carnauba wax because of its hardness or other similar wax having a high melting point, may be utilized. The substance employed as the agent for rendering the web non-absorbent should be harder, or have a higher melting point, than the waxy materials used in the formation of the stencil surface, as this prevents the coating on the under surface of the stencil sheet from rubbing off, or being transferred to the underlying adjacent surface when the stencil surface is removed by the action of the stylus. This waterproof backing I put on the web, or paper, after the stencil surface has been applied as this obviates increasing the thickness of the paper web, rendering it uneven in places, or otherwise affecting the character of the paper in the first instance. The paper being thus plain and smooth enables the coating gage, or gages, to be delicately adjusted to cause the thickness of the stencil coating to be regulated to a nicety and laid with uniform thickness over all parts of the sheet, or web.

The stencil sheet is shown in Fig. 3, disposed with its removable stencil surface 2 in contact with the backing paper C, and consequently its waterproofed surface 3 engages the back of the film B or sensitized surface support, and therefore, if the waterproof coating is of a soft nature it may be transferred to the photographic film which is an objectionable feature.

The opaque and waterproof coatings are applied to the web in a heated fluid condition by any of the several well known types of wax coating machines, the respective solutions being maintained in heated baths or tanks, and the paper which is coated in quantities, is fed first into contact with a coating roller which applies the opaque coating forming the stencil surface, after which the other face of the web contacts with a coating roller which dips into the second bath containing the waterproofing material.

The first or opaque coating is preferably reasonably liquid, or thin, in order that it may be evenly coated upon the paper without the use of brushes or "jiggers" usually employed in coating ordinary carbon paper, and therefore some of the liquid in the coating is absorbed by the fibers of the uncoated paper leaving the carbon and heavier waxes on the surface forming a relatively more brittle layer that may be removed by a stylus. When the waterproof wax coating is subsequently applied to the back of the paper this fills up the remaining pores, renders the paper more transparent, and gives a water repellent surface which prevents the adhesion of the paper to photographic film backing when used in connection therewith.

I claim as my invention:

1. The process of making a waterproof opaque stencil paper consisting in covering a sheet of translucent paper on one side with a removable opaque coating and then applying a waxy waterproof coating to the other side of the sheet.

2. The process of making stencil material consisting in coating one surface of a translucent web of paper with an opaque material sufficiently soft to permit its being easily removed by a stylus and subsequently applying to the other surface of the paper a waterproof coating affording a surface harder than that of the opaque surface.

3. The process of making sheet stencil material consisting in first applying to one surface of a web of translucent paper an opaque coating of waxy material of sufficient softness to enable it to be removed by a single stroke of a stylus and subsequently applying to the other surface of the paper a harder coating of transparent waxy material.

4. An article of manufacture consisting of a sheet of translucent paper rendered opaque by a coating applied on one surface comprising a combination of wax and a suitable pigment and having a coating subsequently applied to the other side only consisting of a transparent wax.

ALBERT F. SULZER.

Witnesses:
RUSSELL B. GRIFFITH,
GEO. W. KELLOGG.